United States Patent Office.

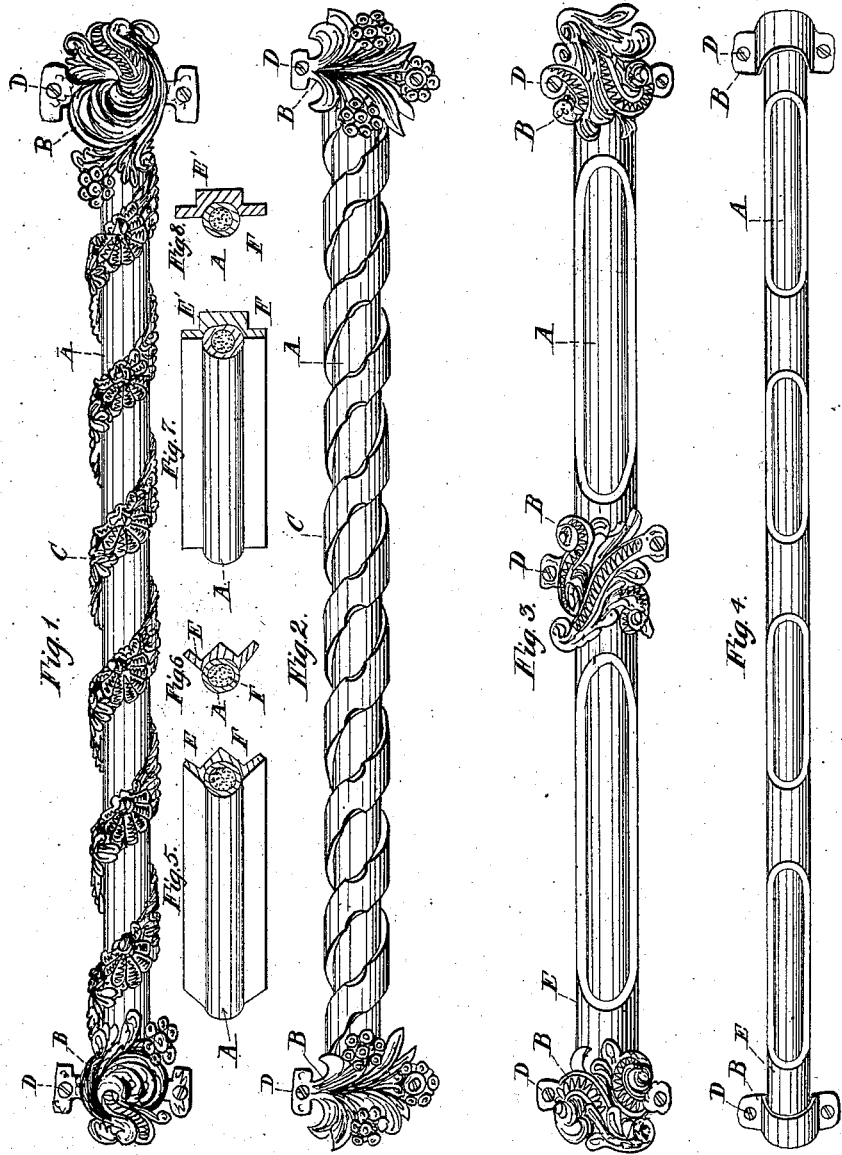

WILLIAM MAROT MARSHALL, OF PHILADELPHIA, PENNSYLVANIA, ASSIGNOR TO HIMSELF AND J. B. ALEXANDER, OF WASHINGTON, DISTRICT OF COLUMBIA.

Letters Patent No. 79,846, dated July 14, 1868.

ORNAMENTING STAIR-RODS, &c.

The Schedule referred to in these Letters Patent and making part of the same.

TO ALL WHOM IT MAY CONCERN:

Be it known that I, WILLIAM MAROT MARSHALL, of Philadelphia, in the county of Philadelphia, in the State of Pennsylvania, have invented a new and improved Method of Constructing Stair-Rods, Mounting for Window-Sash, and other decorations; and I do hereby declare that the following is a full, clear, and exact description thereof, reference being had to the accompanying drawings, and to the letters of reference marked thereon, making a part of this specification, in which—

Figure 1 represents, in perspective, a stair-rod or section of sash-mounting, composed of prepared glass tube, enclosed by an ornamental spiral metallic scroll, either with or without a plain or rabbeted metal or wooden support attached to the back, and surmounted at the ends by ornamental castings or stampings of metal, or other suitable substance.

Figure 2 represents, in perspective, the same as fig. 1, with the exception that the metallic scroll C is plain or smooth on the surface instead of being chased or figured.

Figure 3 represents, in perspective, a stair-rod or section of sash-mounting, composed, as in figs. 1 and 2, with the exception that the metallic case E, enclosing the glass tube A, is tubular, having openings at different intervals in front.

Figure 4 represents, in perspective, the same as fig. 3, with the exception that the openings in the metal cover E are shorter and more frequent.

Figure 5 represents, in perspective, a metallic brace or support holding the prepared glass tube, and rabbeted at right angles to receive plate-glass for the corners of show-cases, aquaria, &c. This support may be made of wood or other suitable material.

Figure 6 represents a transverse sectional view of fig. 5.

Figure 7 represents, in perspective, the same as fig. 5, with the exception that the rabbets for the plate-glass are in a plane line instead of at right angles, allowing it to be used in sash on planes where partition is required without a corner.

Figure 8 represents a transverse sectional view of fig. 7.

Similar letters of reference denote like parts where they occur in the several figures.

A denotes prepared glass tube or rod.

B denotes ornamental mountings in relief.

C denotes the ornamental spiral scroll.

D denotes screws or tacks to confine mountings.

E denotes the metal tube containing the glass, A.

F denotes plaster filling or similar substance.

The nature of my invention consists in the use of glass tubing, prepared by silvering, gilding, or painting the inside surface, and filling it with plaster or other suitable substance, to make it strong, in combination with open-work metal coverings, and ornamental mountings of metal, wood, plaster, or the like in relief, for the purposes of stair-rods, mounting for sash, and other decorations where it can be effectively used.

To enable others skilled in the art to make and use my invention, I will proceed to describe the manner of its construction and use.

I take ordinary glass tubing, whether round, square, or angular, and silver or gild the inner surface by precipitation or any other known means, or I paint the inner surface by flowing any colored paint through the tube, and if I wish to make them stronger, I fill the tube with plaster or a metal rod surrounded by plaster, or with any other suitable material. If I wish to make a stair-rod of the glass tube thus prepared, I have only to insert the ends into metal clasps or fastenings, as seen at B B, figs. 1, 2, 3, and 4, or, for still greater strength and ornament, I enclose the glass tube or rod within open-work metal coverings, either spiral, as seen in figs. 1 and 2, or tubular, with open front apertures, as seen in figs. 3 and 4. If I wish to use the glass tubing for mountings for window or other sash, I enclose it with open-work metal coverings and mountings, as for stair-rod, but attach to the back a metallic rabbeted strip of metal, rabbeted angularly to admit the edges of panes of glass for corners, as seen at E, figs. 5 and 6, and rabbeted in a plane line where partitions are to be made without corners, as seen at E, figs. 7 and 8; or I make sash-mounting by simply grooving a piece of metal, wood, or other material, in such a manner as to admit a part of the glass tube A, and properly rabbeting the edges, angularly for corners, as seen in figs. 5 and 6, and on a plane line for partitions in plane, as seen in figs. 7 and 8.

Thus, I work this prepared glass tube with the metal, wood, plaster, and other combinations, into stair-rods, sash-mountings, and many other useful purposes for decorations, with the most brilliant effect.

What I claim as new and as of my invention, and desire to secure by Letters Patent, is—

1. The use of glass tubing, when supported by metal or other casing, mountings in relief, of metal or other material, or the rabbeted supports, of metal or other material, substantially as described, and for the purpose set forth.

2. The filling of silvered or gilded glass tubes with plaster, cement, or their equivalents, combined with wood or metal rods, substantially as described, and for the purpose set forth.

WM. M. MARSHALL.

Witnesses:
J. B. ALEXANDER,
M. H. COLLINS.